United States Patent [19]

Afshar

[11] Patent Number: 4,975,072

[45] Date of Patent: Dec. 4, 1990

[54] FRONT FACING TERMINAL BLOCK FOR TELECOMMUNICATION MAIN DISTRIBUTION FRAME

[75] Inventor: Mehdi Afshar, Sunnyvale, Calif.

[73] Assignee: Telect, Inc., Spokane, Wash.

[21] Appl. No.: 427,248

[22] Filed: Oct. 25, 1989

[51] Int. Cl.$^5$ .................................. H01R 13/44
[52] U.S. Cl. .................... 439/131; 439/532; 439/719; 361/426; 379/327
[58] Field of Search ............. 174/59, 60; 379/327, 379/326, 328, 329; 361/426, 428, 429; 439/131, 571, 709, 712–714, 718, 719, 723, 724–733, 540, 532

[56] References Cited

U.S. PATENT DOCUMENTS

| | | | |
|---|---|---|---|
| 3,300,686 | 1/1967 | Johnson et al. | 439/69 X |
| 3,784,728 | 1/1974 | De Bortoli et al. | 174/60 |
| 3,831,128 | 8/1974 | Paluch | 174/60 X |
| 3,904,936 | 9/1975 | Hamrick, Jr. et al. | 379/327 X |
| 4,382,649 | 5/1983 | Meyer | 174/60 X |
| 4,538,868 | 9/1985 | Cruise et al. | 439/131 |
| 4,752,107 | 6/1988 | Gunell et al. | 439/709 |
| 4,753,610 | 6/1988 | Eason et al. | 439/571 |
| 4,763,226 | 8/1988 | Pelletier | 439/131 X |
| 4,766,521 | 8/1988 | Pelletier | 439/142 X |
| 4,835,659 | 5/1989 | Goodson | 361/426 X |

Primary Examiner—Neil Abrams
Assistant Examiner—Khiem Nguyen
Attorney, Agent, or Firm—Wells, St. John & Roberts

[57] ABSTRACT

The specification describes a front-facing terminal block 10 for mounting to a support bracket 12 that is affixed to telecommunication main distribution frame for interconnecting telephone equipment. The front facing terminal block 10 has a generally rectangular housing 14 with a top panel 16, rear panel 18, bottom panel 20 that extend between side panels 22 and 24 defining a front opening 28. A terminal field assembly 38, having an insulative panel 40 with an array of electrical terminal pins 50 formed therein, is pivotally mounted adjacent the forward end of the housing 18 for pivotal movement from a down position projecting into the front opening 28 to an upward position away from the front opening 28. The terminal pins 50 connected by wires to either 50-pin female receptacle ribbon connectors 98 or 64-pin female receptacle ribbon connectors 104 or a combination of the two. Such connectors 98 and 104 are adapted to be mounted within 50-pin apertures 98 and 64-pin apertures 88 that are interconnected and overlapping to form a generally enlarged rectangular multiple connector opening 76 illustrated in FIGS. 4 and 5.

10 Claims, 6 Drawing Sheets

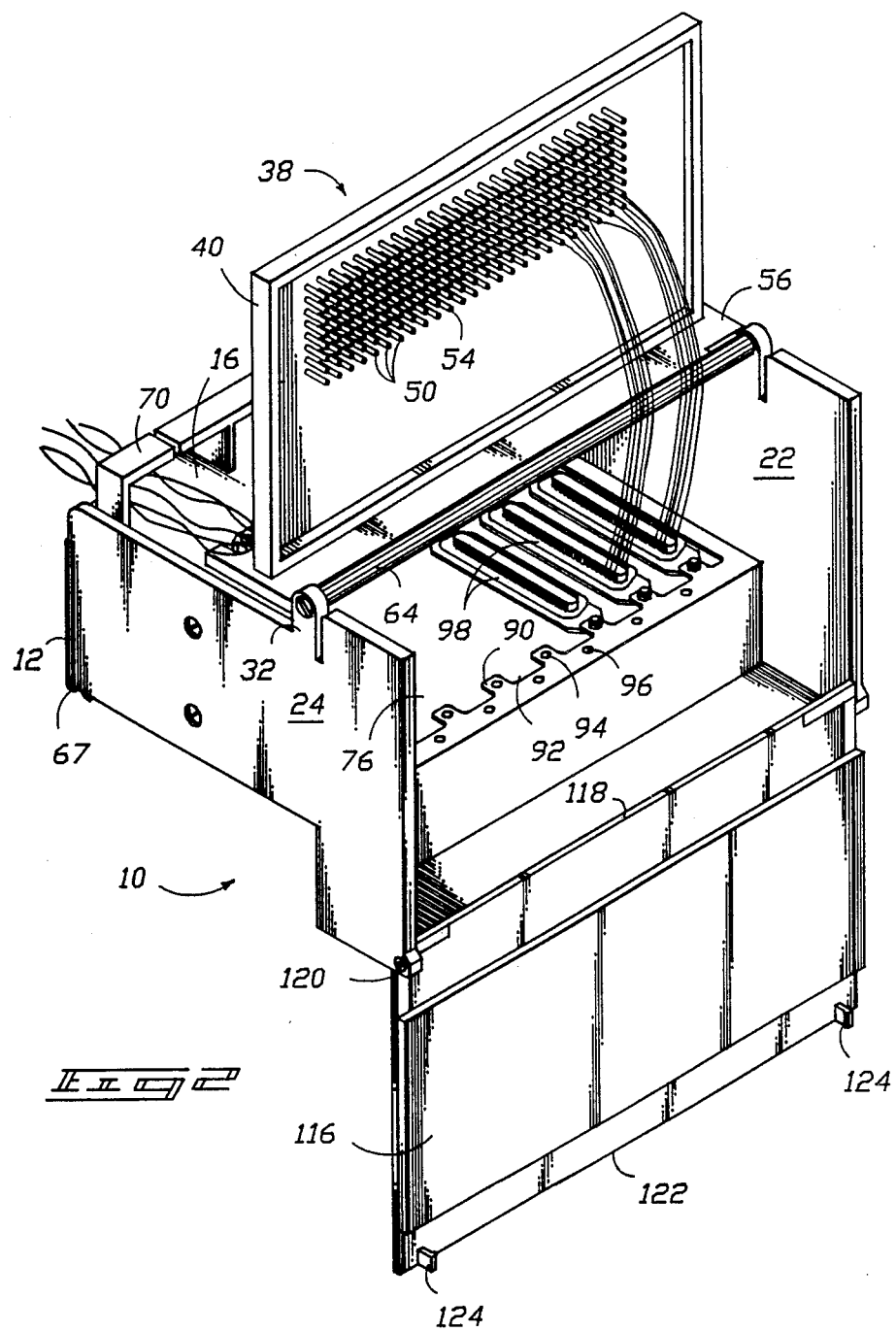

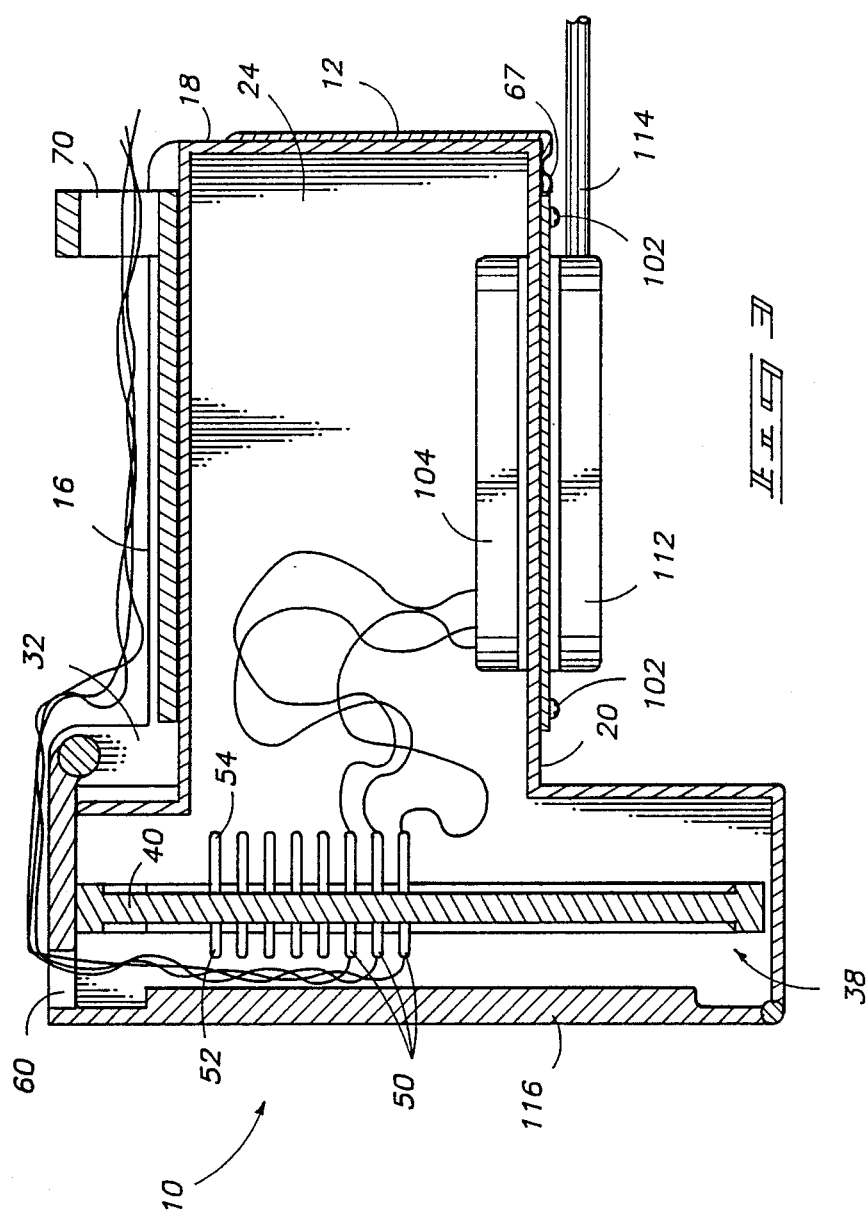

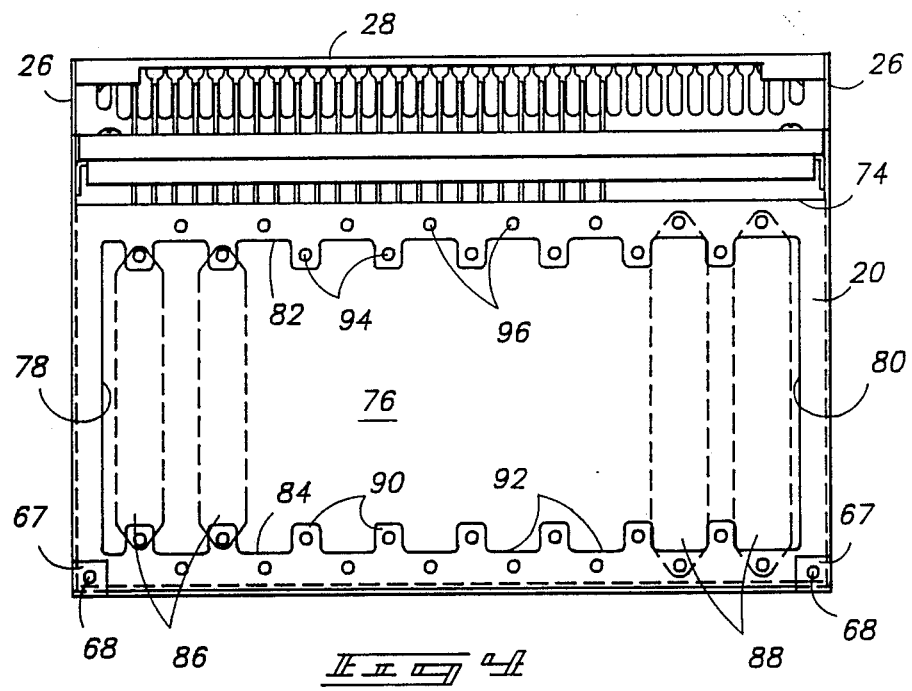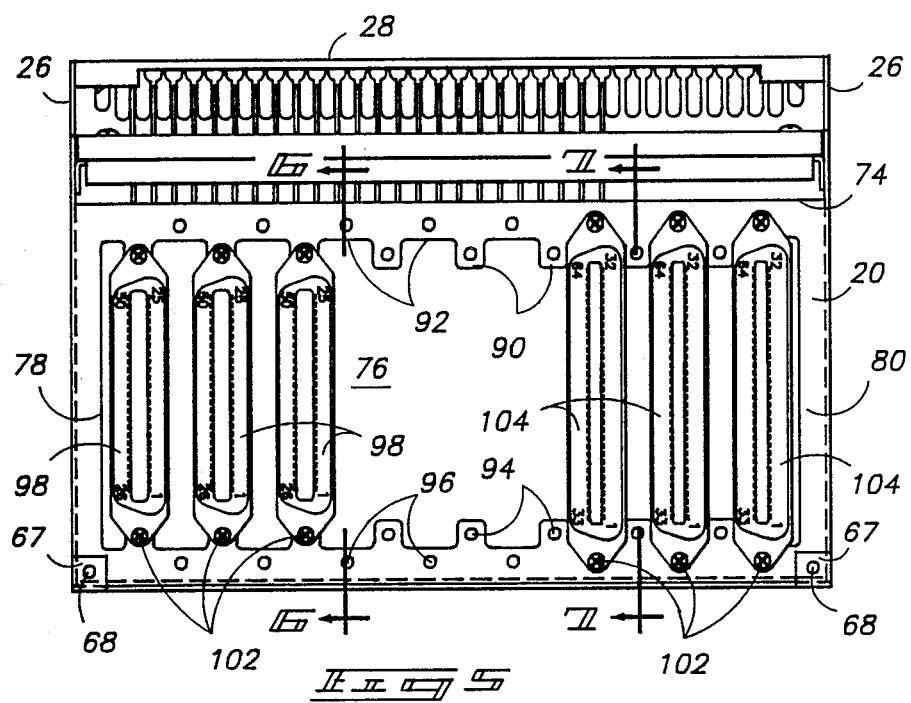

FRONT FACING TERMINAL BLOCK FOR TELECOMMUNICATION MAIN DISTRIBUTION FRAME

TECHNICAL FIELD

This invention relates to front facing terminal blocks for telecommunication main distribution frames that are classified in Class 361, Subclass 426 of the U.S. Patent Classification System and more particularly to those front facing terminal blocks within such group that connect directly to male multi-pin ribbon connectors.

BACKGROUND OF THE INVENTION

Examples of front facing terminal blocks for telecommunication main distribution frames are illustrated in the following U.S. patents:

| Pat. No. | Inventor | Granted |
| --- | --- | --- |
| 3,784,728 | George De Bortoli et al. | 1/8/74 |
| 4,538,868 | Thomas W. Cruise et al. | 9/3/85 |
| 4,752,107 | Gary J. Gunell et al. | 6/21/88 |
| 4,753,610 | John C. Eason et al. | 6/28/88 |
| 4,763,226 | Claude Pelletier | 8/9/88 |
| 4,766,521 | Claude Pelletier | 8/23/88 |

The Cruise et al. U.S. Pat. No. 4,538,868 illustrates in FIGS. 2 and 5 a front facing connectorized terminal block. Such patent shows multi-pin ribbon connectors 42 that are received in elongated openings along a bottom panel of the chassis 40. The elongated openings are offset with respect to each other for the express purpose of providing maximum connector density.

The Gunell U.S. Pat. No. 4,752,107 in FIG. 2 illustrates a plurality of mating connectors 16 mounted along a bottom wall 13 in which the connectors are mounted at oblique angles. The connectors are disposed and angled for the express purpose of minimizing the depth of the housing between the support bracket 46 and the front cover 32.

The Eason et al. U.S. Pat. No. 4,753,610 illustrates a front facing terminal block having a rear panel 46 with female receptacle ribbon connectors 36 mounted therein in a horizontal orientation.

Both of the Pelletier U.S. Pat. Nos. 4,763,226 and 4,766,521 show in various figures the female receptacle ribbon connectors mounted in a bottom panel for receiving corresponding male plug ribbon connectors.

One of the problems associated with such prior art front facing connectorized terminal blocks is the inability to easily mount two different size multi-pin ribbon connectors to the terminal block or to provide a terminal block that is equally adaptable to receiving ribbon connectors of one size or of a second size, particularly 50 pin connectors or 64 pin connectors. Such connectors are standard within the telephone industry. Invariably the customer when specifying the terminal block, specifies whether the terminal block should be manufactured for 50 pin connectors or 64 pin connectors. The manufacturer then constructs the terminal block to fit one or the other but not both. Generally the manufacturer utilizes a different panel should the customer order the terminal block with 50 pin connectors as opposed to one for 64 pin connectors.

One of the principal objects and advantages of the present invention is to provide the capability of utilizing 50 pin connectors or 64 pin connectors or a combination of the two, utilizing a single mounting panel that is configured to accept or receive either size or a combination of the two. Such a feature provides for very efficient manufacturing and it further minimizes the number of parts and the number of terminal blocks that must be inventoried to meet the intended demand.

These and other objects and advantages of this invention will become apparent upon reading the following detailed description of the preferred embodiment.

BRIEF DESCRIPTION OF THE DRAWINGS

The preferred embodiment of the front facing connectorized terminal block is illustrated in the accompanying drawings, in which:

FIG. 2 is a perspective view similar to FIG. 1 except showing a front cover that is pivoted downward with a terminal block assembly pivoted upward;

FIG. 3 is a vertical cross-sectional view taken along line 3—3 in FIG. 1 showing in cross-section a bottom panel with a female receptacle multi-pin ribbon connector mounted thereto connected to a corresponding male ribbon connector;

FIG. 4 is a bottom view of the terminal block illustrating a bottom panel having an enlarged opening for receiving multiple female receptacle multi-pin ribbon connectors;

FIG. 5 is a bottom view similar to FIG. 4 except showing three 50 pin female receptacle ribbon connectors and three 64-pin female receptacle ribbon connectors mounted within the enlarged opening;

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

Figure 1:
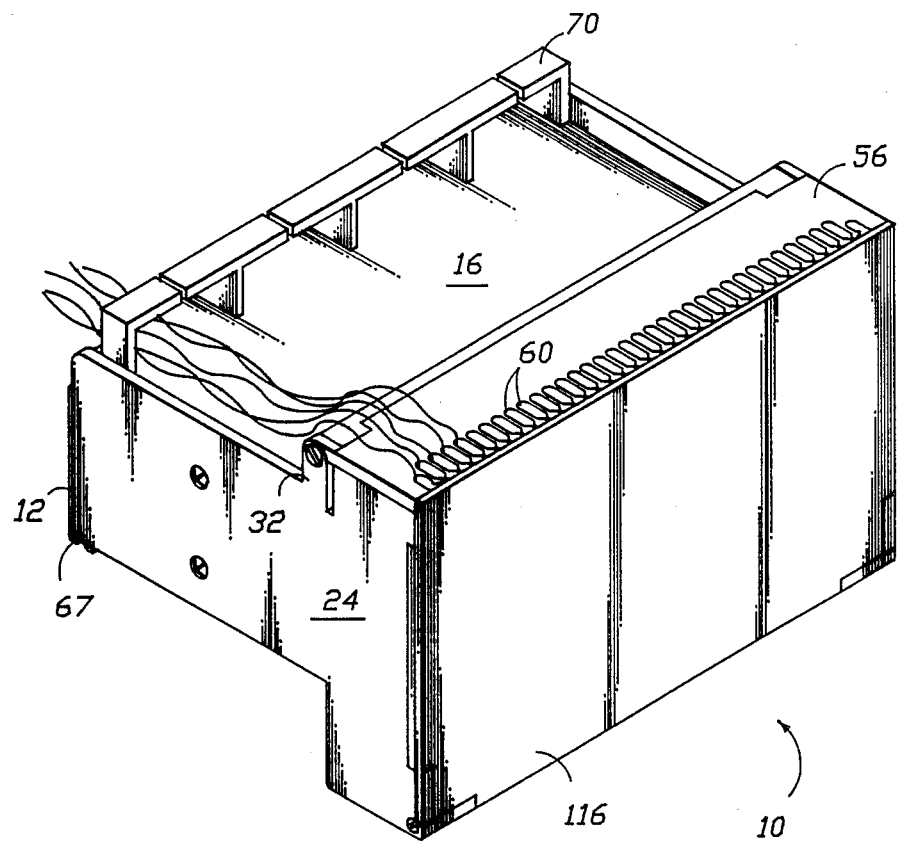
FIG. 1 is a perspective view of the preferred embodiment of the front facing terminal block illustrating the terminal block and a supporting bracket.
Figure 7:
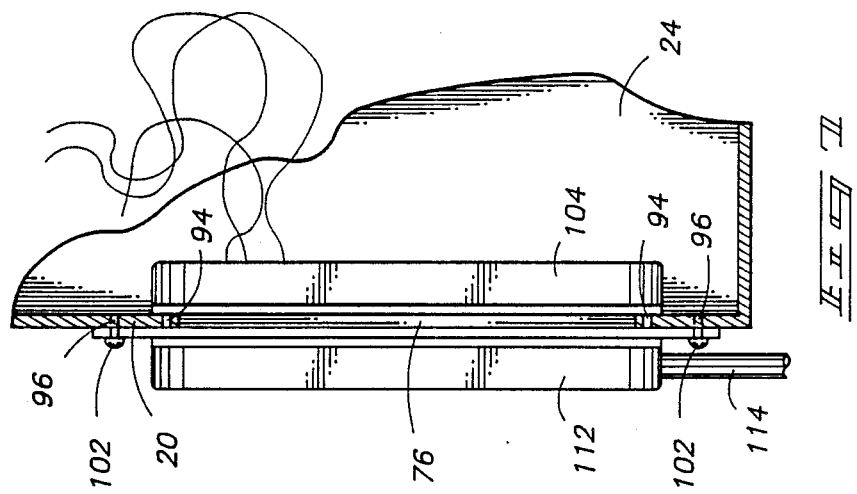
FIG. 7 is a fragmentary cross-sectional view similar to FIG. 6 taken along line 7—7 in FIG. 5 illustrating the mounting of a 64-pin female receptacle ribbon connector to the bottom panel.

There is illustrated in FIG. 1 a preferred embodiment of the front facing terminal block which is generally designated with the number 10 which is mountable to a supporting or mounting bracket 12. The mounting bracket 12 is first affixed to the telecommunication main distribution frame prior to the mounting of the front facing terminal block 10. The terminal block 10 will be described with respect to the mounting bracket 12, noting that each may be manufactured and sold separately or as a unit.

The front facing terminal block 10 has a housing generally designated with the numeral 14 that comprises a top panel 16, a rear panel 18, and a bottom panel 20 that extend between side panels 22 and 24. The housing 14 has a generally rectangular boxed shape with the side panels 22 and 24 having forward projections 26 that extend forward from the top panel 16 and bottom panel 20 forming a front opening generally designated with the numeral 28. The side panels 22 and 24 have indented upper edge sections 30 with upward extending pivot tabs or brackets 32. As illustrated in FIGS. 2 and 3, the housing includes a bottom bracket 34 that extends horizontally between the forward projections 26 adjacent their lower extremities. The bottom bracket 34 has lower corner securing apertures 36 for securing a terminal field assembly 38 in a down position.

The terminal field assembly 38 has, as one of its principal components, an insulative panel 40 of a generally rectangular shape with a front face 42 and a rear face 44 and a top edge 46 and a bottom edge 48.

A plurality of electrical terminal pins 50 extend through the insulative panel 50 with front projections or portions 52 extending outward from the front face 42 and rear projections or portions 54 extending outward from the rear face 44. The plurality of electrical terminal pins are formed in a substantially rectangular array throughout an extensive portion of the insulative panel 40 for receiving terminal ends of electrical wires.

The terminal field assembly 38 further includes a front fanning strip that extends along the top edge 46 of the insulative panels 40 and extending outward over the front face 42 and the rear face 44. The fanning strip 46 extends outward over the front face 44 to a front edge 58. A plurality of fanning apertures 60 are formed in the front edge 58 for routing wires in an orderly disposition through the fanning apertures 60 for connection with the front portions 52 of the electrical terminal pins 50. The fanning strip 56 is secured to the terminal panel 40 by screws 62. The fanning strip extends over the rear face terminating in a rear portion 64 that is pivotally secured to the upward pivot tabs 52 of the side panels 22 and 24.

The terminal field assembly 38 is pivotally mounted with respect to the housing 40 for pivotal movement between a down position in which the insulative panel projects into the front opening 28 as illustrated in FIGS. 1 and 3 with mounting element such as screws extending through the lower corners of insulating panel 40 into the corner securing apertures 36. In the down position the front portions 52 of the terminal pins 50 are available for ready frontal access to enable the installer to easily wire-wrap the terminal ends of electrical wires to the portions 52.

Terminal field assembly 38 is pivotal to an upward position in which the insulation panel 50 is removed from the front opening 28 as illustrated in FIG. 2. In this position the rear projections 58 of the electrical terminal pins are readily exposed to assist in wire-wrapping electrical wires to the rear portions 54.

Figure 8:
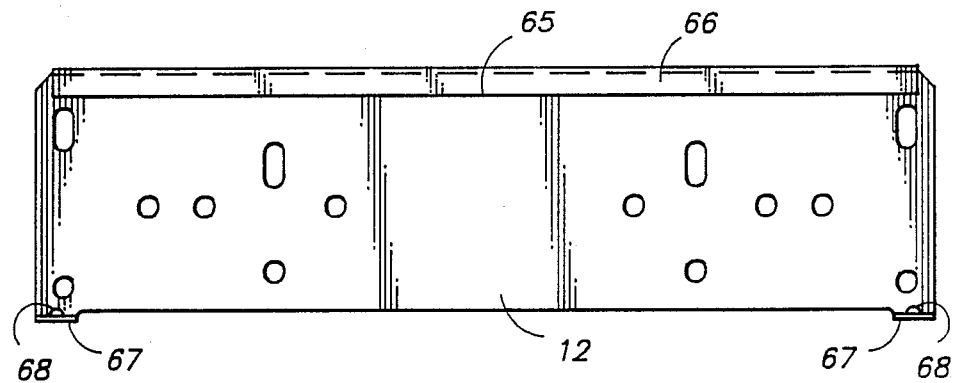
FIG. 8 is a front view of the support panel.
Figure 9:
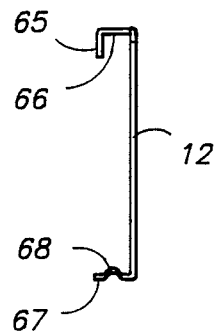
FIG. 9 is an end view of the support panel illustrated in FIG. 8.

The front facing terminal block 10 as previously mentioned is mounted on a support or mounting bracket 12. The supporting bracket 12 has a folded upper edge 65 forming a downward projecting receiving channel 66. The supporting plate 12 further has bottom feet 67 that extend forward at the lower corners of the bracket. Detents 68 are formed on the bottom feet 67 as illustrated in FIGS. 8 and 9.

The top panel 16 of the housing 14 includes a rear fanning strip 70 that facilitates the routing and orderly disposition of the wires for ease of identification and replacement if necessary. The routing of the wires through the rear fanning strip 70 is done in conjunction with the routing of the wires through the front fanning strip 56 to distribute the cross connect wires in an orderly fashion for easy connection to the front projections or portions 62 of the terminal pins 50.

The rear panel 18 has a bent upper edge 72 generally of a horizontal orientation for projecting into and complementary to the channel 66 of the support plate 12. The rear panel has a lower edge 73 that is formed integrally with the bottom panel 20.

The bottom panel 20 has a forward bent edge 74 that is illustrated in FIG. 3. Additionally the bottom panel 20 has dimple apertures 75 formed therein adjacent the rear corners thereof for cooperating with the detent 68 of the mounting bracket 12 to provide a resilient mounting of the terminal block 10 to the mounting bracket 12. To mount the terminal block into the support bracket 12, the bent upper edge 72 of the rear panel 18 is moved upward into the channel 66 and then the terminal block is pivoted somewhat downward with the lower edge 73 of the rear panel moving over the bottom feet 68 with the detents 68 resiliently projecting into the dimple apertures 75.

To remove the terminal block 10 from mounting bracket 12, an upward force placed on the forward portion of the housing 14 to force the detents 68 from dimple apertures 75 to remove the lower edge 74 from the bottom feet 67. Then the rear of the terminal block may be lowered with the upper edge 72 of the rear panel 18 being removed from the channel 66. Preferably, the rear panel 18 and the bottom panel 20 are formed from an integral piece of metal sheet to provide strong housing integrity.

The bottom panel 20 further includes a generally enlarged rectangular multi-connector opening generally designated with the numeral 76 that has opposing side edges 78 and 80 adjacent the sides of the bottom panel 20. Additionally the opening 76 has a serrated front edge 82 and a serrated rear edge 84. Although the multi-connector opening 76 may be thought of as a single opening, it additionally can be considered as a plurality of 50-pin apertures 86 and 64-pin apertures 88 that are interconnecting and overlapping. The 50-pin apertures 86 are interposed between the 64-pin apertures 88 constituting the generally enlarged rectangular multi-connector opening 76. The apertures 86 extend between spaced 50-pin tabs 90 that form the serrations along the serrated front edge 82 and serrated rear edge 84. The tabs 90 are incrementally spaced forming 64-pin edge segments 92 that define part of the 64-pin apertures 88.

Figure 6:
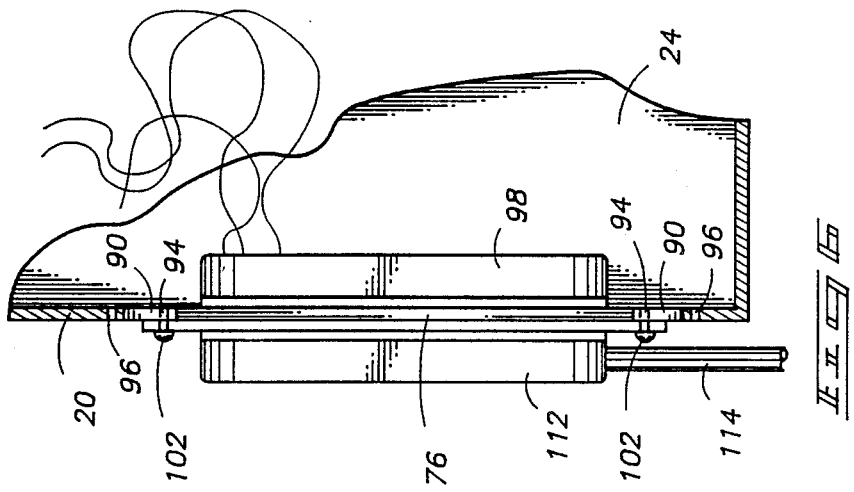
FIG. 6 is a fragmentary cross-sectional view through the bottom panel taken along line 6—6 in FIG. 5 illustrating the mounting of a 50-pin female receptacle ribbon connector to the bottom panel.

Each of the 50-pin connector tabs 90 includes connector mounting holes 94 to facilitate the mounting of the 50-pin connectors within the apertures 86. Likewise, 64-pin connector mounting holes 86 are formed in the bottom panel 20 adjacent the 64-pin apertures near the edge segments 92. Each of the 50-pin apertures 86 are adapted to receive a 50-pin female receptacle, miniature ribbon, connector 98 as illustrated in FIG. 6. Each of the 50-pin female receptacle ribbon connectors 98 are elongated having mounting ends 100 that rest on the tabs 90 with screws or bolts 102 extending into the mounting holes 94. Likewise, 64-pin female receptacle, miniature ribbon, connectors 104 may be mounted in the 64-pin apertures 88 as illustrated in FIG. 6. Each of the connectors 104 are elongated having mounting ends 106. The ends are secured to the bottom panel 20 with screws or bolts 108 that extend through the ends 106 and into the mounting holes 96. Corresponding multi-pin male plug ribbon mating connectors 112 are connected to the respective female ribbon connectors 98.

104. Electrical wire cables 114 extend from the male plug ribbon mating connectors 112 to specific telephone equipment.

It should be specifically noted that the bottom plate 20 with the plurality of overlapping, interconnected and interposed apertures 86 and 88, forming the enlarged multi-connector opening 76, is capable of receiving a plurality of 50-pin female ribbon connectors in each of the apertures 86. Likewise, the bottom panel 20 is capable of receiving a plurality of 64-pin female ribbon connectors 104 in each of the 64-pin apertures 88. Alternatively, a mixture of 50-pin connectors and 64-pin connectors may be mounted as illustrated in FIG. 5. Consequently, the design is very versatile and provides a single mounting plate or bottom panel 20 that can accommodate either 50-pin connectors or 64-pin connectors or a combination of the two. This feature provides for a wide variety of versatility and dramatically decreases inventory problems associated with multiple parts to accommodate multiple size connectors.

Finally, the terminal block 10 includes a front cover 116 for enclosing the front opening 28 when the terminal field assembly 38 is in the down position. The front cover 116 has a lower edge 118 with pivot connections 120 to provide for a pivot of the front cover to a down open position as illustrated in FIG. 2. The front cover 116 has an upper edge 122 with resilient mounting clip 124 formed thereon for projecting into corresponding apertures in the front fanning strip 56 to resiliently lock the front cover in the closed position when the terminal block has been finally loaded and wired with the desired connections.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A front facing connectorized terminal block for mounting to a support bracket affixed to the telecommunication main distribution frame, comprising:
    a terminal block housing having a rear panel that is releasable mountable to the support bracket for supporting the connectorized terminal block on the main distribution frame;
    the terminal block housing having a bottom panel extending between the side panels forward of the rear panel for receiving and supporting a plurality of multi-pin ribbon connectors;
    a terminal field assembly having an insulative panel with an array of electrical terminal pins having first extending from a front face of the insulative panel and second portions extending from a rear face of the insulative panel in which the second portions are adapted to be electrically connected to a plurality of multi-pin female ribbon connectors;
    said terminal field assembly having a fanning strip adjacent the front face of the insulative panel for routing cross connecting electrical wires to the first portions of the array of electrical terminal pins;
    said terminal field assembly being operatively pivotally mounted to the housing for movement between a down pivot position in which the insulative panel projects into the front opening of the housing with the first portions of the array of electrical terminal pins projecting forward for direct frontal access and an up pivot position in which the insulative panel is removed from the front opening of the housing with the second portions of the array of electrical terminal pins projecting forward for direct frontal access;
    a front cover pivotally attached to the housing and operative to enclose the front opening when the terminal field assembly is in the down pivot position; and
    connector mounting means associated with the housing bottom panel capable of receiving and supporting both 50-pin female miniature ribbon connectors and 64-pin female miniature ribbon connectors in a downward orientation to connect to respective upward oriented male miniature ribbon connectors.

2. The front facing connectorized terminal block as defined in claim 1 wherein the connector mounting means includes two sets of mounting apertures, one set for receiving the 50-pin connectors and the second set for receiving the 64-connectors.

3. The front facing connectorized terminal block as defined in claim 2 wherein the mounting apertures of the two sets are interspersed to enable the 50-pin connectors to be interspersed with the 64-pin connectors.

4. The front facing connectorized terminal block as defined in claim 1 wherein the connector mounting means includes a plurality of 50-pin connector apertures formed in the bottom panel to receive a plurality of 50-pin connectors and a plurality of 64-pin connector apertures formed in the bottom panel to receive a plurality of 64-pin connectors.

5. The front facing connectorized terminal block as defined in claim 4 wherein each of the 64-pin connector apertures have a length greater than a corresponding length of each of the 50-pin connector apertures.

6. The front facing connectorized terminal block as defined in claim 4 wherein the 50-pin connector apertures are interspersed between the 64-pin connector apertures.

7. The front facing connectorized terminal block as defined in claim 4 wherein the 50-pin connector apertures and the 64-pin connector apertures are interconnected to define a combined in the bottom panel to receive the connectors.

8. The front facing connectorized terminal block as defined in claim 7 wherein the enlarged opening has two opposing mounting side edges that are serrated with 50-pin mounting tabs extending into the enlarged opening at preselected intervals.

9. The front facing connectorized terminal block as defined in claim 8 wherein the inward projecting 50-pin mounting tabs have mounting holes formed therein to enable 50-pin connectors to be mounting between corresponding mounting tabs of the opposing edges.

10. The front facing connectorized terminal block as defined in claim 1 wherein the bottom panel has a generally rectangular multi-connector opening formed therein contoured with two opposing mounting edges, in which the two opposing mounting edges have opposing mounting tabs formed thereon at spaced intervals that extend toward each other for receiving 50-pin connectors,
    wherein the two opposed mounting edges have edge segments of sufficient dimension between the 50-pin connector mounting tabs to receive 64-pin connectors.

* * * * *